United States Patent
Talbert et al.

(10) Patent No.: US 10,229,015 B2
(45) Date of Patent: Mar. 12, 2019

(54) QUORUM BASED RELIABLE LOW LATENCY STORAGE

(71) Applicant: Microsoft Technology Licensing, LLC, Redmond, WA (US)

(72) Inventors: Nathan Christopher Talbert, Seattle, WA (US); Joel David West, Seattle, WA (US); Edmund Samuel Victor Pinto, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 187 days.

(21) Appl. No.: 15/289,825

(22) Filed: Oct. 10, 2016

(65) Prior Publication Data

US 2018/0060195 A1    Mar. 1, 2018

Related U.S. Application Data

(60) Provisional application No. 62/381,467, filed on Aug. 30, 2016.

(51) Int. Cl.
*G06F 11/00* (2006.01)
*G06F 11/18* (2006.01)

(52) U.S. Cl.
CPC .......... *G06F 11/183* (2013.01); *G06F 11/186* (2013.01); *G06F 2201/805* (2013.01); *G06F 2201/81* (2013.01); *G06F 2201/82* (2013.01)

(58) Field of Classification Search
CPC .................................................... G06F 11/183
USPC .............................. 714/15, 16, 17, 1, 4.1, 18
See application file for complete search history.

(56) References Cited

U.S. PATENT DOCUMENTS

| | | |
|---|---|---|
| 6,453,426 B1 | 9/2002 | Gamache et al. |
| 8,046,469 B2 | 10/2011 | Lubbers et al. |
| 8,443,062 B2 | 5/2013 | Voutilainen et al. |
| 8,850,018 B2 | 9/2014 | Massa et al. |
| 9,081,843 B2 | 7/2015 | Leshchiner |
| 9,225,675 B2 | 12/2015 | Patiejunas et al. |
| 9,305,002 B2 | 4/2016 | Rambacher et al. |

(Continued)

OTHER PUBLICATIONS

Zhang, et al., "Building consistent transactions with inconsistent replication", In Proceedings of the 25th Symposium on Operating Systems Principles, Oct. 4, 2015, 16 pages.

(Continued)

*Primary Examiner* — Dieu Minh T Le
(74) *Attorney, Agent, or Firm* — Jeffrey L. Ranck; Ranck IP Law

(57) ABSTRACT

Representative embodiments disclose a consistent, low latency, reliable storage system that uses quorum logic. An odd number of storage nodes are selected to store data for a client application. The odd number allows a quorum to be determined. When data is written to the storage nodes, success is identified if the data is successfully written to a majority of the storage nodes. Similarly, when a read is performed, success is identified if the majority of the storage nodes return the same value written in the same write operation. This is determined by matching a value and a version number for each node. Additional data is written to the storage nodes along with the values to allow the system to identify and repair inconsistencies in the data. In some embodiments, both the current data and prior data are stored to aid in repairing inconsistent data.

18 Claims, 8 Drawing Sheets

(56) References Cited

U.S. PATENT DOCUMENTS

| | | |
|---|---|---|
| 9,336,060 B2 | 5/2016 | Nori et al. |
| 2010/0106813 A1* | 4/2010 | Voutilainen ........... G06F 9/5061 |
| | | 709/221 |
| 2013/0218840 A1 | 8/2013 | Smith et al. |
| 2014/0101298 A1 | 4/2014 | Shukla et al. |
| 2014/0129519 A1* | 5/2014 | Leshchiner ....... G06F 17/30578 |
| | | 707/613 |
| 2016/0112512 A1 | 4/2016 | Jibbe et al. |

OTHER PUBLICATIONS

"MemtableSSTable", Retrieved on: Aug. 8, 2016 Available at: https://wiki.apache.org/cassandra/MemtableSSTable.

"Microsoft® Windows™ server failover clustering with emc® VPLEX", In White Paper of EMC Corporation, Feb. 2014, 26 pages.

"How is the consistency level configured?", Published on: Oct. 10, 2015 Available at: https://docs.datastax.com/en/cassandra/2.2/cassandra/dml/dmlConfigConsistency.html.

"Example, Clustered Service or Application in a Multi-Site Failover Cluster", Published on: Oct. 2, 2011 Available at: https://technet.microsoft.com/en-us/library/dd197519(v=ws.10).aspx.

\* cited by examiner

QUORUM BASED RELIABLE LOW LATENCY STORAGE

CLAIM OF PRIORITY

This application claims the benefit of and priority to U.S. Provisional Patent Application No. 62/381,467 filed 30 Aug. 2016, which is incorporated by reference herein in its entirety.

FIELD

This application relates generally to storage systems. More specifically, embodiments disclosed herein provide reliable, low latency storage for applications using remote storage systems.

BACKGROUND

Certain applications or services have requirements for high reliability, consistency and low latency. For example, applications and/or services that store certain types of transactional data require that the data stored across multiple data centers or data stores is consistent. Furthermore, the data must be reliable in that data cannot be lost or in an ambiguous state. Finally, low latency is important in order to handle growing numbers of transactions. The properties of high reliability, consistency and low latency are, for example, goals of many, if not most, database systems so that applications and services built upon these database systems meet the desired requirements.

Experience has shown that applications/services that must meet very high reliability and consistency levels for a given 98th-99th percentile latency routinely struggle in achieving their goals when they directly use existing storage technologies. This is because there are so many things that can fail explicitly or run longer than acceptable between the service and the storage node and within the storage node itself. These problems are exacerbated when the storage nodes are remote from the applications/services, such as where data centers are geographically or electronically remote from the application/service itself.

It is within this context that the present embodiments arise.

DETAILED DESCRIPTION

Figure 1:
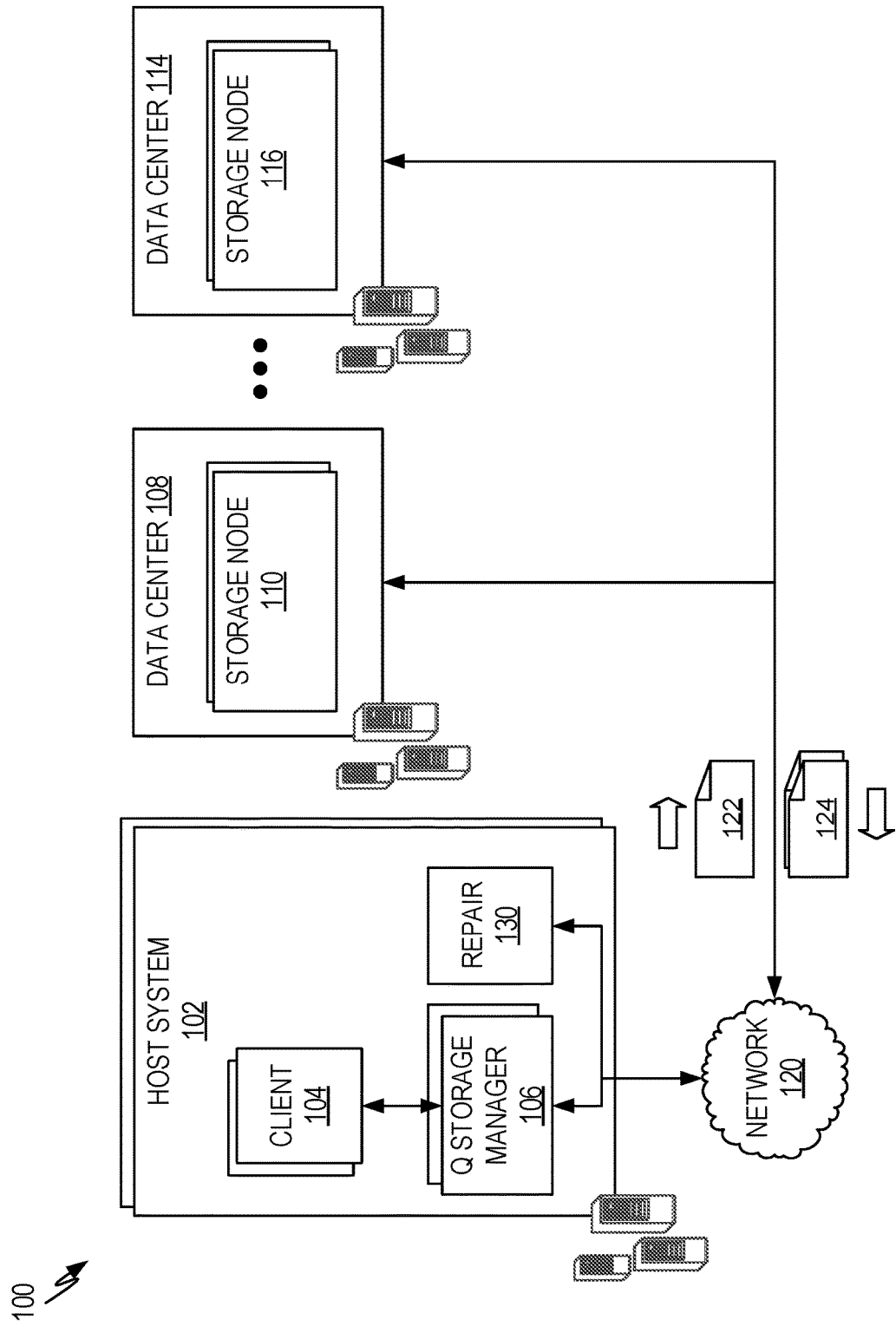
FIG. 1 illustrates an example architecture of a system to provide highly reliable, low latency storage.

The description that follows includes illustrative systems, methods, user interfaces, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Overview

Embodiments disclosed herein include architectures, systems, methods and so forth for a quorum based storage mechanism that provides low latency, high reliability and consistency for demanding data storage requirements. The embodiments disclosed herein can take advantage of geographically remote data storage nodes, such as nodes stored in different, geographically separated data centers. The embodiments leverage multiple individual storage nodes to produce a reliability level that is, from the perspective of a client application, higher than the reliability of any single storage node.

Embodiments use a quorum storage manager (q Storage Manager) to perform read, write and other operations on a set of data storage nodes. Although not required, the set of data storage nodes is typically selected to be an odd number. Quorum logic is used to identify success of the operation at a majority of the storage nodes. Thus, success of an operation is achieved when a majority of the storage nodes report success of the operation. An odd number of nodes generally tolerates the same number of storage node outages and requires fewer successes to achieve a majority. The q storage manager can reside on the host system (i.e., the system hosting the client application(s)) and be used by the client to perform the desired storage operations.

The q storage manager uses an optimistic strategy along with quorum logic to identify success of the desired operations. For example, in a write operation, the q storage manager receives the data to store from the client application. The data, along with additional information, is sent to the storage nodes in, for example, a parallel write operation. The individual storage nodes then report success or failure of the operation. Based on the replies from the storage nodes, the q storage manager identifies whether the write operation succeeded at a majority of the storage nodes. If the operation was a success at a majority of nodes, the q storage manager reports success to the client application. If the operation failed at a majority of the nodes, the q storage manager reports failure to the client application. If the success or failure is unknown at the individual nodes, such as when no reply is received, the q storage manager reports unknown to the client application.

The additional data along with other strategies, explained in the detailed description below, allow the q storage manager to both ascertain consistency and affect repair to the storage nodes when consistency is broken among the nodes or when nodes are out of sync with each other. A repair process can run in the background identifying and repairing consistency and/or synchronization issues. Additionally, or alternatively, repair can be triggered by a write, read, or other operations. The q storage manager can also compact data that meets certain requirements in order to reduce overall storage requirements for data.

DESCRIPTION

FIG. 1 illustrates an example architecture 100 of a system to provide highly reliable, low latency storage. The architecture 100 includes host system 102 and multiple storage nodes, 110, 116. The storage nodes 110, 116 can be located remotely from the host system 102, such as in a data center 108 or 114, respectively or can be located close to host system 102. Storage nodes 110, 116 in data centers 108, 114 can be part of a cloud computing architecture, if desired. In other words, data centers 108, 114 can be data centers implementing a cloud computing architecture and storage nodes 110, 116 can be part of the storage systems of such cloud computing architecture. In other embodiments, data centers 108, 114 and storage nodes 110, 116 can be part of a non-cloud computing architecture.

In the embodiments described herein, the number of storage nodes 110, 116 used in the system is selected to be greater than one so that a majority can always be determined in the quorum logic as explained below. An odd number is typically selected since an odd number generally tolerates the same number of storage node outages as the next highest even number while requiring fewer nodes to achieve the majority. In the quorum logic used by embodiments of the disclosure, the majority is defined as:

1+Floor(NodeCount/2)

Where NodeCount is the number of storage nodes and Floor( ) is the floor function. The table below shows the nodes required for a majority and the number of storage node outages that can be tolerated before a majority cannot be achieved.

| Number of Nodes | Majority | Node Outages Tolerated |
|---|---|---|
| 2 | 2 | 0 |
| 3 | 2 | 1 |
| 4 | 3 | 1 |
| 5 | 3 | 2 |

Thus, a four node system tolerates the same number of outages as a three node system while requiring more nodes for success to be achieved. Thus, odd numbers are typically chosen, although this is not a requirement.

The storage nodes 110, 116 are treated by the system as individual storage devices, such as a disk drive, SAN, volume, and so forth as further explained below.

One or more client applications 104 interface with at least one quorum storage manager (q storage manager) 106. The q storage manager 106 interfaces with the individual storage nodes 110, 116 and handles data storage tasks on behalf of the client application 104. In some embodiments, q storage manager 106 can be made part of the operating system of the host system 102 while in other embodiments, the q storage manager 106 can run on top of the operating system, as part of a subsystem, and/or so forth. Similarly, the q storage manager can execute as part of, or in conjunction with, a virtual machine, a virtual machine monitor, and so forth. It does not matter, for purposes of explanation, exactly where the q storage manager 106 operates and resides as long as the client application 104 can interface with the q storage manager 106 in order to invoke the storage functions provided by the q storage manager 106.

The q storage manager 106 provides highly reliable, consistent, low latency storage to the client applications 104. Thus, the client applications 104 can invoke functions such as read, write, and other storage related functions from the q storage manager 106.

Upon invocation of one of the functions, the q storage manager 106 receives appropriate information from the client application 104 and translates the desired function into actions to be taken by the storage nodes 110, 116. These actions are illustrated by function message 122 which is sent to the storage nodes 110, 116 over a network 120. The individual storage nodes respond with responses 124, which are analyzed by the q storage manager 106 to determine success or failure of the requested operation and the result is returned to the client application 104.

The q storage manager 106 operates based on parallel reads/writes and quorum logic. For example, if the client system 104 desires to write (store) data, the q storage manager 106 will invoke a write function in the storage nodes 110, 116 in parallel (or nearly parallel). This means that all storage nodes will be invoked without waiting for a reply from any storage node as to the success or failure of the invocation. For example, if the method of invocation is message based, such as where a "write" message is sent to the storage nodes 110, 116 in order to invoke the write function, then a message will be sent to each storage node without waiting for a reply before sending the next message. Depending on the particular mechanism for invocation, this may mean directing a common message to all storage nodes 110, 116, or it may mean directing individual massages to the individual storage nodes one after the other without waiting for a reply before the next message is sent. Other methods of invocation in other embodiments would be similarly invoked in a simultaneous or near simultaneous manner so that any replies are not evaluated before all storage nodes 110, 116 are invoked.

After invocation, the q storage manager 106 evaluates the responses 124 from the individual storage nodes 110, 116. The q storage manager 106 then determines what the replies from a majority of the storage nodes 110, 116 indicate. For example, if a majority of the storage nodes 110, 116 report success, the q storage manager 106 returns an indication of success to the client application 104. If a majority of the storage nodes 110, 116 indicate failure, then the q storage manager 106 returns an indication of failure to the client application 104. In some embodiments, the q storage manager 106 lets the client application 104 know if the q storage manager 106 cannot determine whether the operation succeeded or failed. For example, the q storage manager 106 cannot determine either success or failure of an individual storage node 110, 116 for example, when no reply was received from a particular storage node. In this situation, if the q storage manager 106 cannot determine either success or failure at a majority of the individual storage nodes 110, 116, the q storage manager 106 returns an indication of unknown result to the client application 104.

As explained in greater detail below, the q storage manager 106 adds additional information to the data to be stored. In some embodiments, this additional data includes at least one of a version number and a key. The key is used to identify a storage location, such as a "row" within a database and represents the manner in which the specific location is identified. As explained in greater detail below, a key can have one "master" version and the individual storage nodes 110, 116 can use "variations" of the key. In alternative embodiments, all keys used by the individual storage nodes 110, 116 can be the same.

The version number is used to identify a particular write operation. The intent is to be able to distinguish between two different write operations that write the same value. In some embodiments, the version numbers are not simply incremented every write, but are generated in a way that results in unique version numbers for different write operations, such as using a Globally Unique ID (GUID) or other unique identifier as a version number. In other embodiments, other mechanisms can be used as long as the version number is not repeated for different write operations, even when the write operation originates with different client applications and/or q storage managers.

The version number is changed when information is stored. In other words, if at time T1 the q storage manager 106 stores value "A" with version number V1, those nodes that successfully store the data will have version number V1 and a value of "A". Thus a version number indicates the last successful data written to a given storage node.

Throughout this disclosure there is mention of nodes agreeing on a value or values matching. Two nodes agree on a value if they both recorded the value as part of the same write operation. Value agreement is write instance agreement, not value equality. In other words, two nodes may contain the same set of bytes, but if those came from different write operations, then the two nodes do not agree on the value. For example, if at time T1 q storage manager 106 stores value "A" and version number V1, those nodes that successfully complete the operation will have value "A" and version number V1. Those nodes that do not successfully complete the operation may have some other value and/or version. Even if later those nodes end up with value "A" there is not value agreement because it was not written in those nodes as part of the same write operation (i.e., as evidenced by version number V1). Write instance agreement is identified at a minimum by agreement of the version number between two nodes. In some embodiments both version number and value agreement are used to identify write instance agreement.

The additional data added by q storage manager 106 to identify errors and repair them when they occur. Identification and repair of errors is discussed below. Identification and repair of errors can take several forms that can be used in various combinations in different embodiments. In one embodiment, a separate process, such as maintenance process 130 can execute in the background and can check for errors in the storage nodes 110, 116, for example by reading information from the individual storage nodes 110, 116 and comparing the responses that are returned. As errors are identified, the maintenance process 130 can correct the identified errors. In FIG. 1 the maintenance process 130 is illustrated as separate from q storage manager 106. In alternative embodiments, the maintenance process 130 can be part of q storage manager 106.

In addition to, or in lieu of, the maintenance process 130, as data is written to or read from storage nodes 110, 116 by the q storage manager 106, the q storage manager may identify situations where repair is needed. Thus, the q storage manager 106 can repair the data or may pass information to the maintenance process 130 to kick off a repair method for the data that needs to be repaired.

Figure 2:
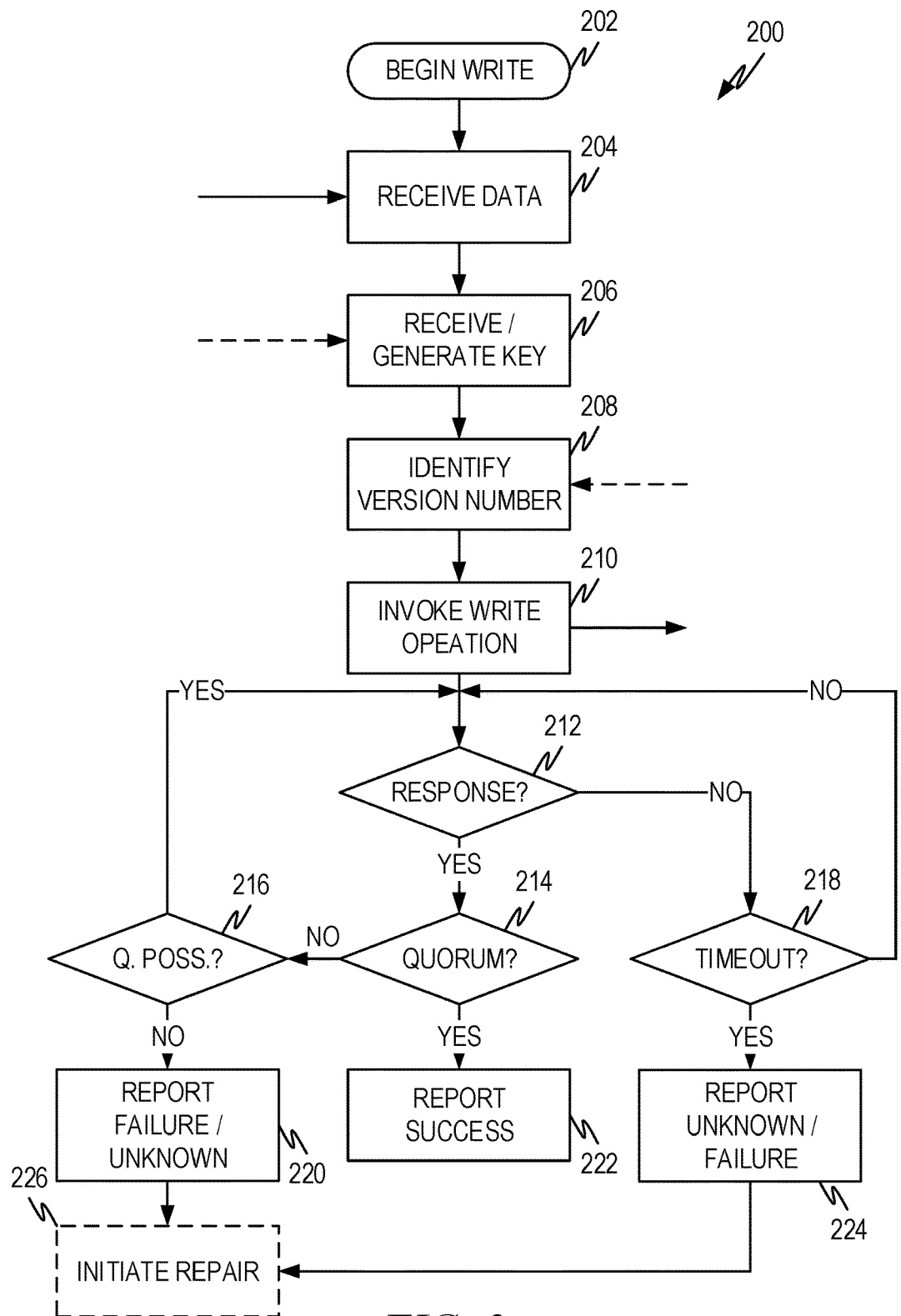
FIG. 2 illustrates an example flow diagram illustrating write operations.

FIG. 2 illustrates an example flow diagram 200 illustrating write operations. The method begins in operation 202 and proceeds to operation 204 where the data to be written is received, for example from the client application 104. In operation 206 the q storage manager 106 either generates or receives the key for the data. In some instances the key can be generated by the q storage manager 106 while in other instances the key can be received from another location, such as from the client application 104. Any combination thereof can also be used. Thus, in one embodiment, a key is generated by the q storage manager 106 the first time data is to be stored. The key can then be returned by the q storage manager 106 to the client application 104 and when the client application 104 desires to update the data stored in the location identified by the key, the client application 104 can present the key to the q storage manager 106.

In this disclosure key is intended to refer to any identifier that identifies a location where the data is to be stored. Thus, to later retrieve the data, the key would be used to retrieve the data. Keys can be static or can be changed as the data is updated. For example, some storage systems have a location identifier that changes with subsequent write operations. This type of identifier can be used as a key. The q storage manager 106 keeps track of the changes made to the identifier and ensures that the most recent value is always held by the client application 104 so the proper data can be retrieved as desired. Additionally, it is not necessary that the key be consistent across storage nodes. For example, if there are three storage nodes, A, B, and C, the keys may be different between the different storage nodes and the q storage manager 106 tracks which keys are associated with which storage nodes. A "master" key can be created by "packing" the individual keys into a single value that can be held by the client application 104 and "unpacked" when the value is returned to the q storage manager 106 for data retrieval. After unpacking, the proper key can be passed to the proper storage node to retrieve the desired information from each of the individual storage nodes. Combinations thereof are also utilized in some embodiments.

In operation 208 the version number for the data to be retrieved is identified. This can be accomplished in some embodiments by the q storage manager 106 keeping track of the most recent version number for each storage location (i.e., as identified by the keys). In these embodiments, operation 208 represent retrieving the most recent version number from its storage location.

In some embodiments, the q storage manager does not retain separate information relies on the information stored in the individual storage nodes. Thus, in operation 208 these embodiments can issue a read request for the information stored at the key location. As the responses are returned, operation 208 can identify the most recent version, for example, by identifying the version number held by the majority of the individual storage nodes. As a representative example, consider a system that uses three storage nodes. In operation 208, the q storage manager 106 issues a read request for the key location. If two or more of the nodes agree on the most recent version number, that version number can be taken as the most recent version number. If no majority of nodes agree on the most recent version number, or if insufficient responses are received to identify the most recent version number, the method can either kick off a repair process (discussed below) in order to repair the error, or can exit with a failure message returned to the client application 104, or both.

Once the most recent version number is identified in 208, the q storage manager 106 invokes the write operation at the individual storage nodes as indicated in operation 210. As previously described, the write function is invoked at one node without waiting for a reply from prior invoked nodes. To the extent supported by the individual storage nodes, the write functions are invoked simultaneously.

In this disclosure, invoking an operation at individual storage nodes will typically be described in terms of creating and sending an appropriate message (i.e., a write message, a read message, etc.). However, for those systems that are invoked in a different manner, such as through a remote procedure call, a service invocation, or some other way, those of skill in the art will readily understand how to invoke the appropriate operation using the appropriate mechanism with parameters similar to, or the same as, the parameters in the messages described herein. Thus, no further attempt will be made to describe all the various ways in which storage operations at the different storage nodes can be invoked and the focus will be on the information associated with the various invocations. A similar approach is taken to explanations of the responses from the individual storage nodes.

The write function is invoked using one or more of: 1) a key; 2) a version number; and 3) the data to be written. The contents of the write message are discussed further in conjunction with FIG. 3 below.

Once the write functions are invoked at the individual storage nodes, the q storage manager 106 evaluates replies from the individual storage nodes. In geographically diverse storage nodes, this may mean that some replies come back quickly while others come back more slowly or not at all. In embodiments of the disclosure, the outcome to the write function comprises at least one of: 1) success; 2) failed; 3) unknown (sometimes referred to as result unknown). Success indicates that in the absence of additional writes, subsequent reads will return the written value or unknown. Failed indicates that in the absence of additional writes, subsequent reads will return the original value (i.e., value before the write) or unknown. Unknown means that the outcome may have been either success or failed, but the q storage manager cannot tell (i.e., because no or insufficient responses were received from the storage nodes). In some embodiments only two of the three possible states are used, such as success or failure and failure can indicate anything other than a success.

One possible implementation of the above is illustrated by operations 212, 214, 216, 218, 220, 222, 224 and 226 of FIG. 2. In the flow diagram of FIG. 2 illustrates an embodiment where the q storage manager 106 waits: 1) until a quorum indicating success is identified; 2) until a quorum cannot be achieved; or 3) until a particular length of time expires.

After the storage nodes are invoked with the write operation, operation 212 identifies if a response has been received. If not, execution passes through the "no" branch to operation 218 where the system tests to see if the designated time interval (i.e., the wait time) has expired. If not, execution passes through the "no" branch back to operation 212. This loop waits until either a response is received, or until the time interval has expired.

When a response is received (operation 212) execution passes through the "yes" branch to operation 214. Operation 214 tests to see if a quorum has been established by the immediately received response. As indicated above, a quorum means that a majority of the storage nodes have responded and that the responses indicates a write success at the majority of the storage nodes. For example, a write response message may return an indication of success, meaning that the value and additional information (such as version number) have been successfully stored at the location indicated by the associated key. Alternatively, the write response may include the actual parameters stored, such as some combination of version number, value and/or key and the q storage system 106 can identify whether a majority matches (i.e., they match as part of the same write operation as indicated by version number or version number and value as explained above).

If a quorum exists (i.e., a majority of the storage nodes report success or match on write), then there is no need for the system to wait until a response has been received from all storage nodes and execution proceeds from operation 214 through the "yes" branch to operation 222 where success is reported to the client application 104. Operation 214 may report success by returning one or more of: 1) an indication of success; 2) the key for the storage location; 3) the value written; or 4) the version number.

Although not shown in FIG. 2, embodiments can implement a "majority wait time" that will wait a designated period of time prior to reporting success in 222 even after a majority is received to see any additional responses are received. In these embodiments, even after a quorum is detected in operation 214, execution will loop back to operation 212 to wait for additional responses (until the designated majority wait time expires) before reporting success. In these embodiments the execution flow is more complicated than illustrated in FIG. 2, but those of skill in the art will have no problem identifying how to implement a majority wait time as disclosed herein.

If a quorum is not found to exist at operation 214, execution proceeds through the "no" branch to the test to see if a quorum is still possible (operation 216). In some instances, this can be tested by seeing if all storage nodes have returned responses (i.e., is the number of responses R equivalent to the number of storage nodes N). In other instances, the test is a bit more complicated. For example, if the number of storage nodes is three, then even if two nodes do not agree, the response from the third may match one of the two existing responses and the test of "have all nodes responded" is insufficient to test for whether it is still possible to have a quorum. Thus, in the storage nodes=3 embodiment, a quorum is still possible even where two responses do not match and execution should proceed from the "yes" branch to operation 212. However, if the number of storage nodes is five and four responses have been returned, none of which match, it is clear that waiting for the fifth response will not matter as the fifth response cannot make a quorum, even if it matches one of the other received responses. Thus, it does not make sense to wait for the fifth response and execution can proceed to operation 220.

If no quorum is possible, then the write operation has failed (or the result is unknown) and execution proceeds through the "no" branch to operation 220 where failure is reported to the client application 104. Failure/unknown can be reported to the client application 104 by returning one or more of: 1) and indication of failure (or unknown); 2) the key for the storage location; 3) the value attempted to be written; or 4) the version number.

In addition to reporting failure, the responses returned to the q storage manager 106 may indicate that a repair is indicated for the keyed location. Thus, optionally the q storage manager 106 may invoke the repair operation (discussed below) to repair problems identified by the responses as indicated by optional operation 226.

If a quorum does not exist and a quorum is still possible, execution proceeds through the "yes" branch to operation 212 to await another response or expiration of the time interval.

If the time interval expires without a quorum or without failure, execution proceeds out of operation 218 through the "yes" branch to operation 234. This operation can report unknown or failure as the case may be based on the responses received prior to expiration of the timer. Additionally, in some embodiments repair can be initiated as indicated by operation 226 as appropriate.

Figure 3:
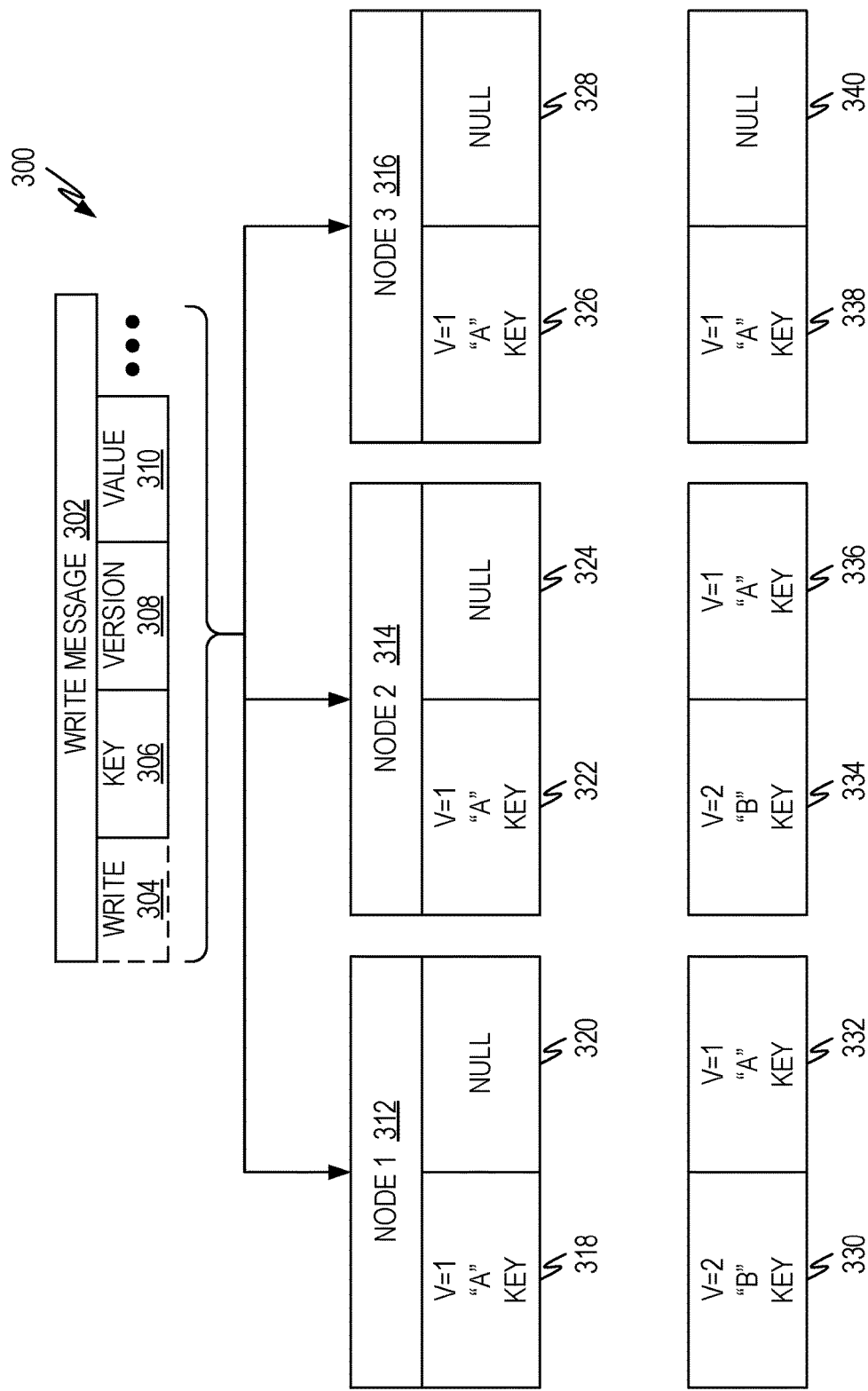
FIG. 3 illustrates example data structures and storage for write operations.

FIG. 3 illustrates example data structures and storage 300 for write operations. FIG. 3 illustrates a sample write message 302. As previously indicated, this sample write message 302 may be indicative of a message, if the write operation is invoked at the storage nodes based on a message, or may be indicative of the parameters used to invoke a write operation if the write operation is invoked at the storage nodes in some other fashion (e.g., remote procedure call, etc.).

Write message 302 comprises one or more of: an identifier indicating the message is invoking a write operation 304, a key identifying the storage location to be written to 306, a version number 308, a value to be written 310, and/or other fields (indicated by the ellipses). These fields have been explained previously with the exception of the identifier 304. In some message based protocols used to invoke functionality (such as the write operation at the storage nodes), the messages contain an ID to that lets the recipient know what type of message is being received. Thus, the identifier 304 may be optional or missing in some embodiments or may be specified as part of the invocation in other embodiments.

The illustration in FIG. 3 indicates that write message 302 is sent to three nodes: node 1 312, node 2 314, and node 3 316. As previously discussed, in some embodiments the same message can be used to invoke all storage nodes while in other embodiments, separate messages are used to invoke separate storage nodes. If separate messages are used to invoke separate storage nodes, some field values may be different between the messages. For example, if the different storage nodes use different keys as previously explained, the messages may contain different keys. Thus, in that example, a "master" key can be used to derive "node keys". Thus, if the master key is Key, the key for node 1 312 may be KeyA, the key for node 2 314 may be KeyB, and the key for node 3 316 may be KeyC. As explained above, the q storage manager 106 can keep track of the differences in keys or derive the appropriate keys needed between the storage nodes in these embodiments. However, because "matching" means to match the same value on the same write operation, the version number 308 and the value 310 are consistent between the different messages/storage nodes on the same write operation.

In some embodiments, both the current information and the "prior" information are stored in the keyed storage locations of the storage nodes. Thus, assuming write success at all three nodes, after the information in the write message 302 is written to the three storage nodes, node 1 312 will have the version number V=1, the value="A" and the key=KEY as the "current" information 318 and since there is no "prior" information, the prior information storage 320 is null. Node 2 314 has the same current information 322 and a null prior information 324. Node 3 316 has the same current information 326 and the same null prior information 328.

Now suppose the next write message sent to the three storage nodes contained a version number, V=2, a value="B", and the same key=KEY. If the write succeeds at node 1 312 would have for its current information 330, version V=2, value="B", and key=KEY. The prior information 332 would be version V=1, value="A" and key=KEY. If the write succeeds at node 2 314, it would have the same current information 334 (version V=2, value="B", and key=KEY) and the same prior information 336 (V=1, value="A" and key=KEY). However, if the write failed at a node, for example node 3 316, then the current information 338 (V=1, value="A" and key=KEY) and prior information 340 (null) would remain unchanged.

While the above example has been characterized in terms of two successive write operations (i.e., write one set of data and the write a new set of data), there are other equivalent operations that can be used. For example, the first time new data is written into a blank "row" (i.e., keyed location), an "insert" function could be used. When data is added and the intent is to move the current information to the prior information slot and add the new information an "update" function could be used. If it is necessary to overwrite data as part of a repair operation (see below) an "overwrite" or "overwrite current" function can be used in order to overwrite just the current information. Note, however, these functions can be made equivalent as those of skill in the art will understand. The implications of parallel writes from multiple writers and the repair functions are discussed below and use the "insert," "update" and "overwrite current" functions for purposes of discussion.

Figure 4:
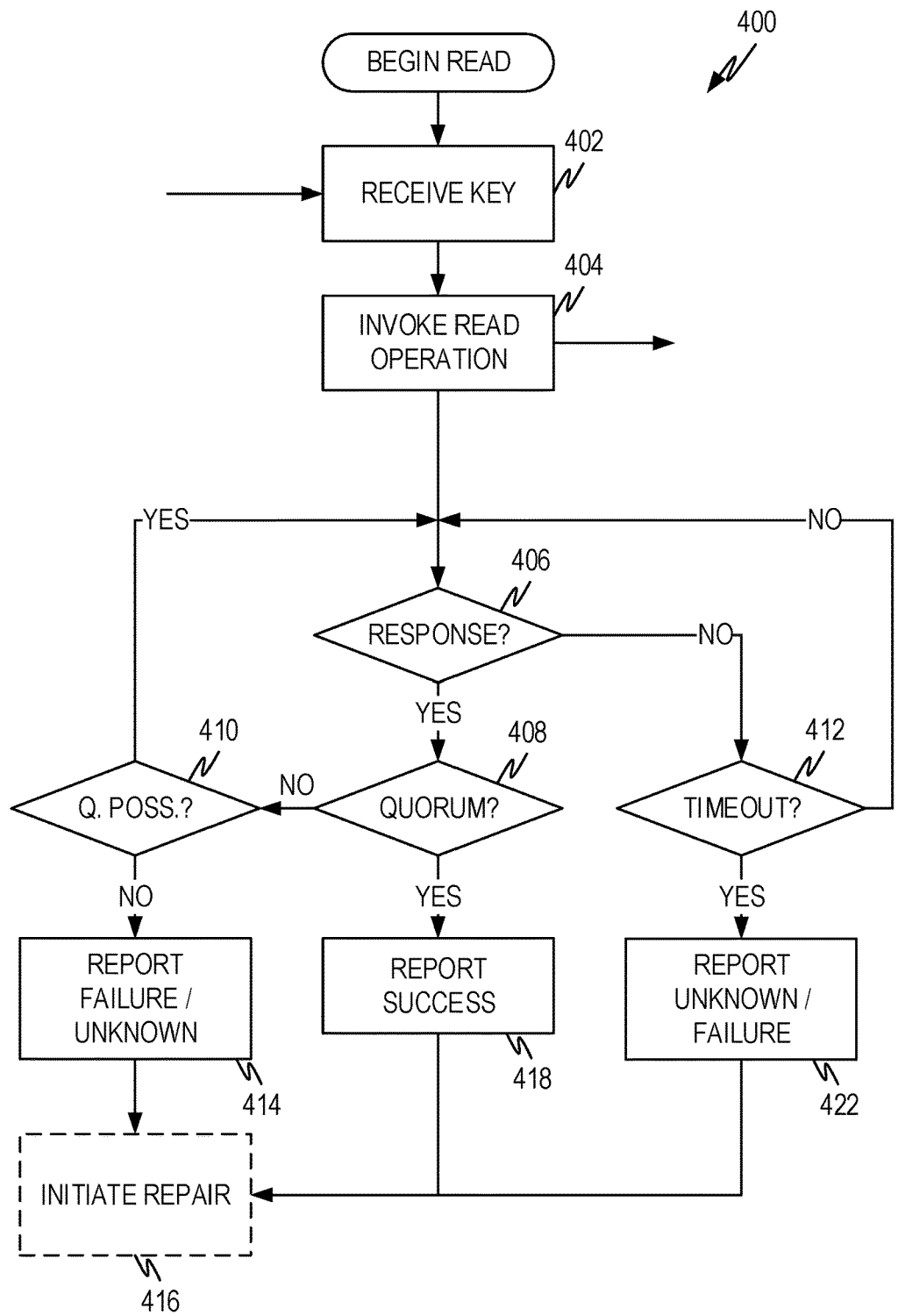
FIG. 4 illustrates an example flow diagram illustrating read operations.

FIG. 4 illustrates an example flow diagram 400 illustrating read operations. In operation 402 a key is received from the client application 104. As discussed, the key identifies the location to be read and, if the different storage nodes utilized different keys, may require unpacking or translation to the keys used by the individual storage nodes.

Figure 5:
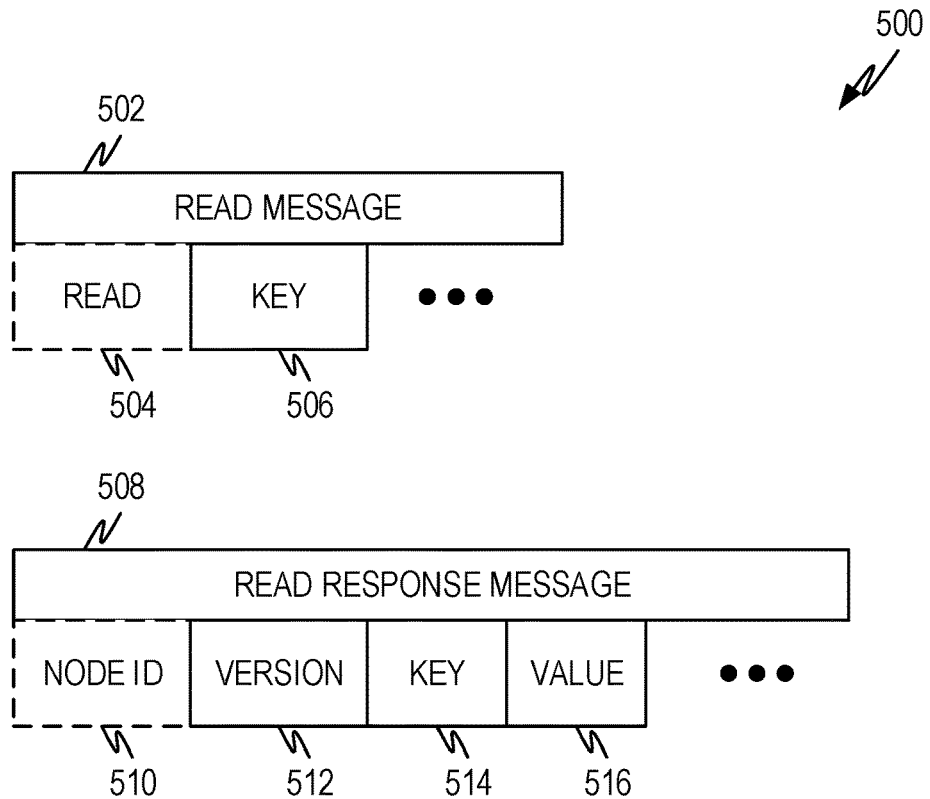
FIG. 5 illustrates an example data structures for read operations.

Operation 404 invokes the read operation from the individual storage nodes for the key. As previously indicated this will be explained in terms of creating and sending a read message, but may vary depending on how the read functionality is invoked at the different storage nodes. Turning for a moment to FIG. 5, a representative read message 502 is illustrated. The read message 502 comprises at least the key 506 that will let the individual storage node know what information should be returned (i.e., the information stored in the storage location identified by the key) along with (in some embodiments) an identifier 504 indicating the message is a read message. As before, not all embodiments need have an identifier 504.

Returning to FIG. 4, operation 404 invokes the read operation at the individual storage nodes in parallel. As explained above in connection with the write operation, in this context "in parallel" means that the system will not necessarily wait around for a response from one storage node before invoking the read operation on the next storage node.

Once the read functions are invoked at the individual storage nodes, the q storage manager 106 evaluates replies from the individual storage nodes. In geographically diverse storage nodes, this may mean that some replies come back quickly while others come back more slowly or not at all. In embodiments of the disclosure, the outcome to the write function comprises at least one of: 1) success (i.e., a value); 2) failed; 3) unknown (sometimes referred to as result unknown); and 4) needs repair. Success indicates that in the absence of additional writes, subsequent reads will return the same value or unknown. Failed indicates that in the absence of additional writes, subsequent reads will return failed or unknown. Unknown means that the outcome may have been either success or failed, but the q storage manager cannot tell (i.e., because no or insufficient responses were received from the storage nodes). Needs repair indicates that the row is in an unusable state and needs to have the repair function performed. In the absence of repairs, subsequent reads will return needs repair or unknown. In some embodiments only two of the three possible states are used, such as success or failure and failure can indicate anything other than a success. In other embodiments, three of the possible states are used, such as 1) success or failure or unknown; or 2) success or failure or needs repair.

One possible implementation of the above is illustrated by operations 406, 408, 410, 412, 414, 416, 418, and 422 of FIG. 4. In the flow diagram of FIG. 4 illustrates an embodiment where the q storage manager 106 waits: 1) until a quorum indicating success is identified; 2) until a quorum cannot be achieved; or 3) until a particular length of time expires.

After the storage nodes are invoked with the read operation, operation 406 identifies if a response has been received. If not, execution passes through the "no" branch to operation 412 where the system tests to see if the designated time interval (i.e., the wait time) has expired. If not, execution passes through the "no" branch back to operation 406. This loop waits until either a response is received, or until the time interval has expired.

When a response is received (operation 406) execution passes through the "yes" branch to operation 408. Operation 408 tests to see if a quorum has been established by the immediately received response. As indicated above, a quorum means that a majority of the storage nodes have responded and that the responses return matching values. As indicated above, matching means more than that the values match. Matching means that the nodes both recorded the value as part of the same write operation (i.e., write operation matching). This is identified, as explained above, by matching version numbers or matching version numbers and matching values (different embodiments can test for matching in different ways).

If a quorum exists (i.e., a majority of the storage nodes report a match for the same write operation), then there is no need for the system to wait until a response has been received from all storage nodes and execution proceeds from operation 408 through the "yes" branch to operation 418 where success is reported to the client application 104. Operation 418 may report success by returning one or more of: 1) an indication of success; or 2) the value retrieved from the storage nodes.

Although not shown in FIG. 4, embodiments can implement a "majority wait time" that will wait a designated period of time prior to reporting success in 418 even after a majority is received to see any additional responses are received. In these embodiments, even after a quorum is detected in operation 408, execution will loop back to operation 406 to wait for additional responses (until the designated majority wait time expires) before reporting success. In these embodiments the execution flow is more complicated than illustrated in FIG. 4, but those of skill in the art will have no problem identifying how to implement a majority wait time as disclosed herein.

Even if a quorum is found (operation 408) and success is reported (operation 418), for example by returning the value to the client program 104, the responses that have been received may still indicate that a repair could be used. In this situation, some embodiments may invoke a repair, as indicated in operation 416.

If a quorum is not found to exist at operation 408, execution proceeds through the "no" branch to the test to see if a quorum is still possible (operation 410). In some instances, this can be tested by seeing if all storage nodes have returned responses (i.e., is the number of responses R equivalent to the number of storage nodes N). In other instances, the test is a bit more complicated. For example, if the number of storage nodes is three, then even if two nodes do not agree, the response from the third may match one of the two existing responses and the test of "have all nodes responded" is insufficient to test for whether it is still possible to have a quorum. Thus, in the storage nodes=3 embodiment, a quorum is still possible even where two responses do not match and execution should proceed from the "yes" branch to operation 406. However, if the number of storage nodes is five and four responses have been returned, none of which match, it is clear that waiting for the fifth response will not matter as the fifth response cannot make a quorum, even if it matches one of the other received responses. Thus, it does not make sense to wait for the fifth response and execution can proceed to operation 414.

If no quorum is possible, then the write operation has failed or the result is unknown and execution proceeds through the "no" branch to operation 414 where failure or unknown result is reported to the client application 104. Failure or unknown can be reported to the client application 104 by returning one or more of: 1) and indication of failure or unknown; or 2) the key for the storage location.

In addition to reporting failure, the responses returned to the q storage manager 106 may indicate that a repair is indicated for the keyed location. Thus, optionally the q storage manager 106 may invoke the repair operation (discussed below) to repair problems identified by the responses as indicated by optional operation 416.

If a quorum does not exist and a quorum is still possible, execution proceeds through the "yes" branch to operation 406 to await another response or expiration of the time interval.

If the time interval expires without a quorum or without failure, execution proceeds out of operation 412 through the "yes" branch to operation 422. This operation can report unknown or failure as the case may be based on the responses received prior to expiration of the timer. Furthermore, a repair can be initiated (operation 416) as appropriate.

FIG. 5 illustrates an example data structures 500 for read operations. The read message 502 has already been discussed above. In response to a read message 502, each storage node can issue a response message 508. The response message can include one or more of the following fields: a node ID 510 indicating which storage node the response is from; a version number 512 as previously discussed; a key 514 as previously discussed; and a value 516 returned in response to the read request. Not all of these fields are required in all response messages and some embodiments may user fewer or more fields. In order to determine a match, as previously discussed, the version number is used. Thus, embodiments of the disclosure include a version number or other mechanism for the q storage manager 106 to identify whether the returned value was written in the same write operation as another storage node. Also, the purpose of the read is to obtain the stored value, so the value is returned by embodiments of the disclosure.

Figure 6:
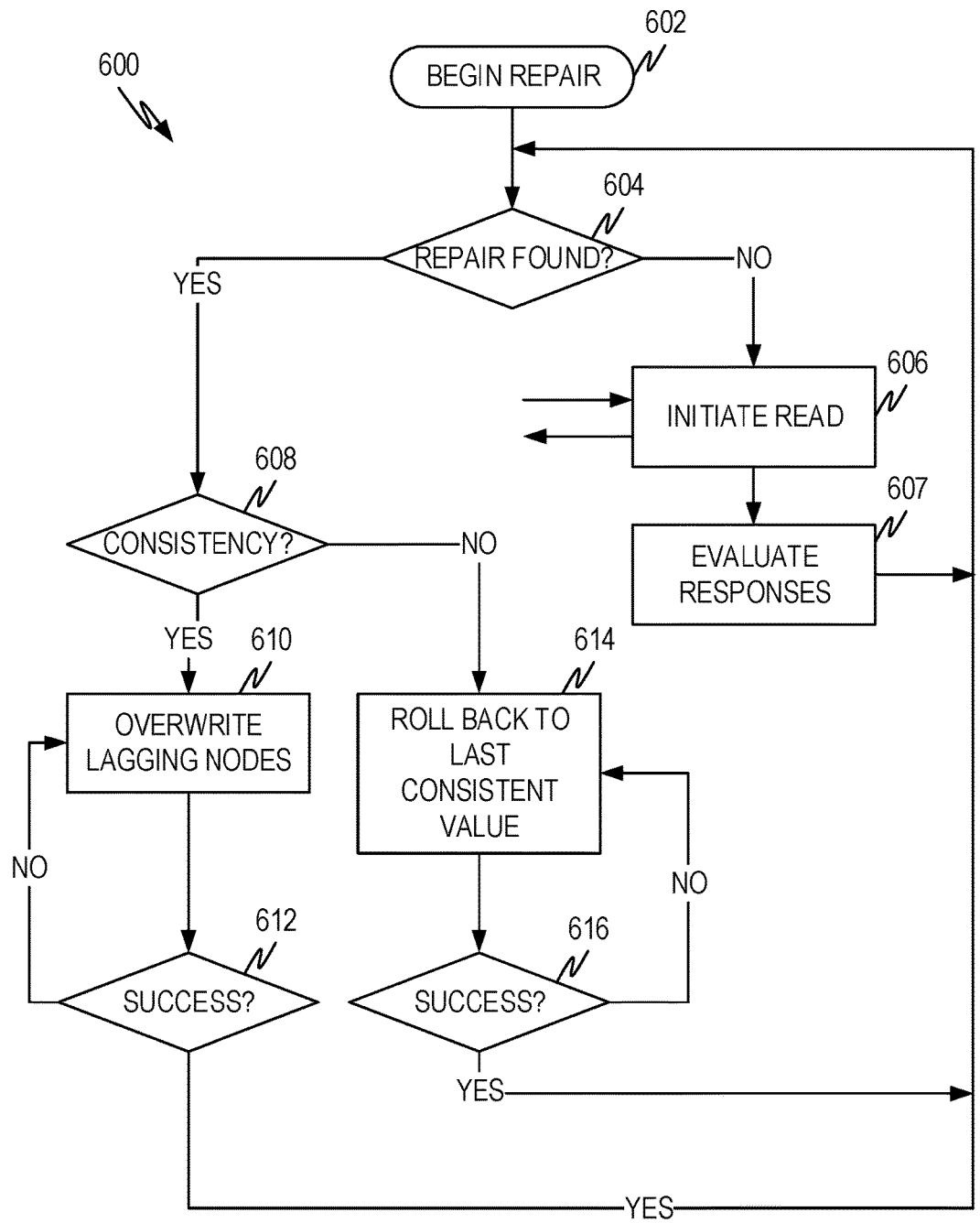
FIG. 6 illustrates an example flow diagram illustrating repair operations.

FIG. 6 illustrates an example flow diagram 600 illustrating repair operations. Repair operations fall into two types. In the first type, the repair is for out of sync nodes. In this situation, a number of storage nodes less than the majority have a previous version of the data. As a majority still agree on the correct version consistency is not broken. However, as performance is better when all storage nodes agree, the q storage manager can watch for this scenario on an ongoing basis in order to repair the lagging storage nodes. A representative storage pattern triggering this type of repair is illustrated in table 1:

TABLE 1

| consistency maintained | | | | | |
|---|---|---|---|---|---|
| Node #1 | | Node #2 | | Node #3 | |
| Current | Previous | Current | Previous | Current | Previous |
| RV = 2 "b" etagD | RV = 1 "a" | RV = 2 "b" etagE | RV = 1 "a" | RV = 1 "a" etagC | Null |

In this situation, Node 1 and Node 2 have the current information (i.e., version=2, value "b") while Node 3 lags behind at the previous information (i.e., version=1, value "a"). Repair can be affected by taking the information that the quorum agrees on (i.e., version=2, value "b") and writing it to the lagging nodes (i.e., node 3 in this example).

The second type of situation that leads to repair is where consistency is broken and no quorum is possible. In this situation, the data for a given set of keys is not consistent across a majority of storage nodes. This situation can result from several causes, but is most commonly the result of multiple sequential write attempts where not all storage nodes receive the request. The q storage manager can watch for this scenario on an ongoing basis in order to repair consistency and restore visibility to the data for the client application. A representative storage pattern for triggering this type of repair is depicted in table 2:

TABLE 2

| consistency broken | | | | | |
|---|---|---|---|---|---|
| Node #1 | | Node #2 | | Node #3 | |
| Current | Previous | Current | Previous | Current | Previous |
| RV = 2 "b" etagD | RV = 1 "a" | RV = 2 "c" etagE | RV = 1 "a" | RV = 2 "d" etagF | RV = 1 "a" |

Since no quorum is possible, the system rolls back the state of the storage to the last consistent version. In this situation, the last consistent version is the previous version (version number=1, value "a"). Thus, this repair would overwrite the current information with the last consistent version of the information.

Turning now to the details of the flow diagram 600, the repair begins in operation 602 and proceeds to operations designed to identify whether a repair is needed. Thus, operation 604 identifies whether a repair has been found. This can occur either because the repair is operating as indicated in FIG. 1 with repair process 130 scanning the storage nodes in order to identify repairs (i.e., see below for operation 606) or because a repair has already been identified (i.e., by read operation of FIG. 4 or write operation of FIG. 2).

If a repair has not been identified (i.e., because the repair process is operating as process 130 and is scanning the storage nodes), the "no" branch out of operation 604 is taken and the process initiates a read operation on the next location (i.e., row) as illustrated in 606. Once the replies from the nodes are received, operation 607 evaluates the responses and determines if a repair is needed.

If a repair has been found, either by operations 606/607 or because the repair process was invoked by a read or write operation that found a repair (FIG. 2 and FIG. 4), the "yes" branch is taken out of operation 604 to operation 608 and the type of repair is identified. As noted above, there are two types of repairs. The first is where consistency still exists among the majority of the storage nodes (i.e., a quorum exists among the nodes) and the second is where consistency does not exist. These were explained above.

If consistency still exists, the "yes" branch is taken out of operation 608 and the repair is effectuated by overwriting the present data in the lagging nodes with the data of the quorum (i.e., the version number and value of the quorum). For the example of Table 1 above, this would mean overwriting the present data of node 3 with version number 2 and the value of "b."

Operation 612 double checks to ensure that the repair was effectuated and if not, can continue trying or, after a certain time period or a certain number of tries, can exit with an error that the row cannot be repaired or with an error to try repair later. Once the repair has been completed, the "yes" branch out of operation 612 indicates that the process can continue scanning for rows to be repaired or can start the next repair. In the alternative, the process can exit with a success indication.

If consistency is broken, such as in the example of Table 2 above, then the "no" branch out of operation 608 is taken and the repair is effectuated by rolling the row back to the last consistent version (operation 614). This can be identified by a quorum of the "prior data" in the storage nodes. In the example of Table 2, this would result in the "prior data" of value "a" being written to the current data of all three nodes, while maintaining the current version (i.e. version=2). This drives the row to the last consistent value.

Operation 614 double checks to ensure that the repair was effectuated and if not, can continue trying or, after a certain time period or a certain number of tries, can exit with an error that the row cannot be repaired or with an error to try repair later. Once the repair has been completed, the "yes" branch out of operation 614 indicates that the process can continue scanning for rows to be repaired or can start the next repair. In the alternative, the process can exit with a success indication.

Examples of other repair strategies are discussed below and can be used in conjunction with, or in alternative to, one or more of the operations illustrated in FIG. 6.

Figure 7:
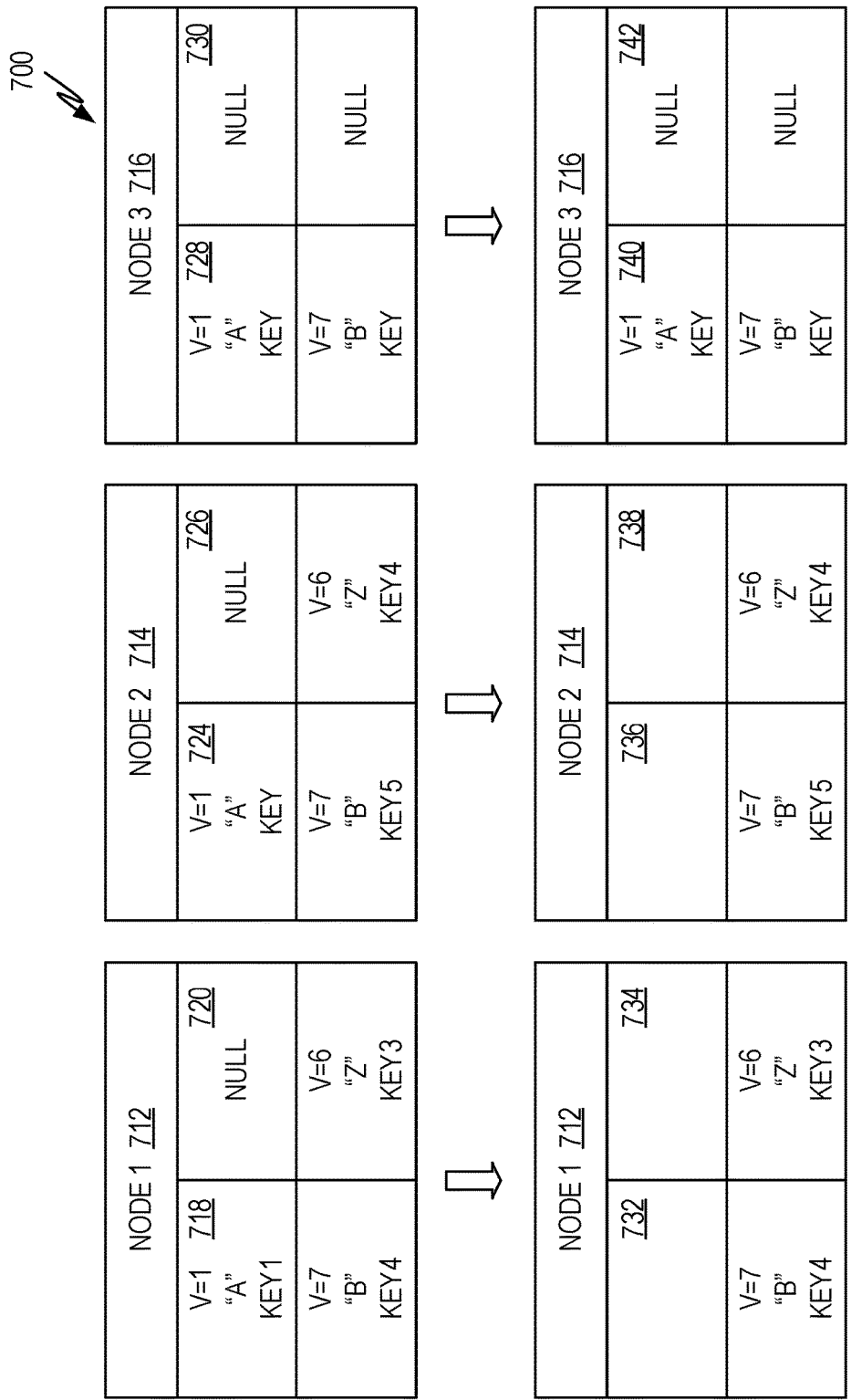
FIG. 7 illustrates an example storage state for compacting data.

FIG. 7 illustrates an example storage state 700 for compacting data. In some situations, it is desirable to reduce the overall storage that is used to store the information by the q storage manager. For example, for old data or data that is unlikely to be accessed, it may be beneficial to evaluate the trade-off between the total amount of storage allocated and the latency and reliability of the data. If the total amount of storage is to be reduced, the data can be compacted as indicated in FIG. 7.

In FIG. 7, node 1 712, node 2 714 and node 3 716 contain a row of data that should be compacted. The data to be compacted is indicated by 718, 720, 724, 326, 728 and 730. Compaction occurs by removing data that is redundant from one or more storage nodes and leaving the data in the remaining node(s). In this case where the number of nodes is three, redundant data can be removed from one or two nodes. Thus, the data can be compacted by removing the data from 718, 720, 724 and 726 as shown by 732, 734, 736 and 738 being empty. In this example, storage node 3 716 remains the same as shown by 740 and 742.

When redundant data is removed, the data that is "kept" can be marked so that if it is read by the q storage manager, the q storage manager will know that only one copy of the data exists by design and that consistency was not broken. In this situation, the q storage manager will not attempt to make a quorum from the data, but will use the sole copy from node 3 as the data. The data can be "rehydrated" by copying the data from node 3 back to node 1 and node 2.

EXAMPLES

The following represent examples of read and write operations that lead to success, failure, and/or the need for a repair operation. They are presented here to further illustrate various embodiments of the disclosure.

Example 1

Insert Success. In this example, the three nodes have rows that are "null," and do not contain any information:

| Node #1 | | Node #2 | | Node #3 | |
|---------|----------|---------|----------|---------|----------|
| Current | Previous | Current | Previous | Current | Previous |
| Null | Null | Null | Null | Null | Null |

The q storage manager issues a write command to write the value of "a" (Write1→Insert("a")). At each node the following occurs:
 1. Insert(Node #1, 1, Write1, "a")→Success
 2. Insert(Node #2, 1, Write1, "a")→Success
 3. Insert(Node #3, 1, Write1, "a")→Success
 4. Result Success At each node the result is as shown in the table below. In this example, each key is different for the three nodes and the storage system for the storage nodes changes the key on each write. Thus, the key for node 1 is "etagA," the key for node 2 is "etagB," and the key for node 3 is "etagC." The key returned to the client application 104 can be a combination of the keys (i.e., etags="etagAetagBetagC") or can be derived in some way from the individual node keys.

| Node #1 | | Node #2 | | Node #3 | |
|---------|----------|---------|----------|---------|----------|
| Current | Previous | Current | Previous | Current | Previous |
| RV = 1<br>Write1<br>"a"<br>etagA | Null | RV = 1<br>Write1<br>"a"<br>etagB | Null | RV = 1<br>Write1<br>"a"<br>etagC | Null |

Example 2

Update Success. In this example, the q storage manager updates the current state of the storage nodes shown in the table below to value "b."

| Node #1 | | Node #2 | | Node #3 | |
|---------|----------|---------|----------|---------|----------|
| Current | Previous | Current | Previous | Current | Previous |
| RV = 1<br>Write1<br>"a"<br>etagA | Null | RV = 1<br>Write1<br>"a"<br>etagB | Null | RV = 1<br>Write1<br>"a"<br>etagC | Null |

In order to do this, the q storage manager first obtains the stored keys using a command such as: etags=Read( ) This command can also result in identification of the current version number (i.e., RV=1) for the write command (Write2→Update("b", etags)) used to update the value from the current value "a" to the desired value "b." Thus, the q storage manager can issue the following commands to the storage nodes:
 1. Update(Node #1, 2, Write2, "b", etagA)→Success
 2. Update(Node #2, 2, Write2, "b", etagB)→Success
 3. Update(Node #3, 2, Write2, "b", etagC)→Success
 4. Result Success At each node, the successful update will result in the following. As discussed above, the keys are updated with each write, as is the version number. The current version of the data is saved as a previous version.

| Node #1 | | Node #2 | | Node #3 | |
|---------|----------|---------|----------|---------|----------|
| Current | Previous | Current | Previous | Current | Previous |
| RV = 2<br>Write2<br>"b"<br>etagD | RV = 1<br>Write1<br>"a" | RV = 2<br>Write2<br>"b"<br>etagE | RV = 1<br>Write1<br>"a" | RV = 1<br>Write2<br>"b"<br>etagF | RV = 1<br>Write1<br>"a" |

Example 3

Racing Updates with Repair. This example shows what happens when multiple writes from different client applications occur in parallel. Because there is no "gatekeeping" function on the q storage manager 106, writes at different nodes may happen in different orders in the face of multiple writers (i.e., multiple q storage managers each with one or more client applications or multiple client applications of a single q storage manager). The following examples illustrate the implications of this design and set the stage for discussion of repair functionality in conjunction with FIG. 6. Three storage nodes will be used in this representative example, along with the functions of "insert," "update," and "overwrite current" instead of the general "write" function. However, these are simply representative examples and a general "write" function can be used in the alternative.

As shown, racing writes can result in a situation where repair is needed as the order of writes is not guaranteed. The following table represents the initial condition before the updates occur.

| Node #1 | | Node #2 | | Node #3 | |
|---------|----------|---------|----------|---------|----------|
| Current | Previous | Current | Previous | Current | Previous |
| RV = 1<br>Write1<br>"a"<br>etagA | Null | RV = 1<br>Write1<br>"a"<br>etagB | Null | RV = 1<br>Write1<br>"a"<br>etagC | Null |

As before, the q storage manager first obtains the stored keys using a command such as: etags=Read( ). In this example, there are three writes that attempt to occur in parallel: (1) Write2→Update("b", etags); (2) Write3→Update("c", etags); and (3) Write4→Update("d", etags). The following represents one possible scenario with the racing writes. In parallel:
 1. Write2→Update("b", etags)
  i. Update(Node #1, 2, Write2, "b", etagA)→Success because it is the first write.
  ii. Update(Node #2, 2, Write2, "b", etagB)→Etag Violation (assume this is actually processed after Write3 updates Node #2)

iii. Update(Node #3, 2, Write2, "b", etagC)→Etag Violation (assume this is actually processed after Write4 updates Node #3)
iv. Result Failed because of the failure of the last two operations, which were processed after writes from the other write operations below.
2. Write3→Update("c", etags)
i. Update(Node #1, 2, Write3, "c", etagA)→Etag Violation (assume this is actually processed after Write2 updates Node #1)
ii. Update(Node #2, 2, Write3, "c", etagB)→Success
iii. Update(Node #3, 2, Write3, "c", etagC)→Etag Violation (assume this is actually processed after Write4 updates Node #3)
iv. Result Failed because of the failure of the two operations, which were processed after writes from the other write operations.
3. Write4→Update("d", etags)
i. Update(Node #1, 2, Write4, "d", etagA)→Etag Violation (assume this is actually processed after Write2 updates Node #1)
ii. Update(Node #2, 2, Write4, "d", etagB)→Etag Violation (assume this is actually processed after Write3 updates Node #2)
iii. Update(Node #3, 2, Write4, "d", etagC)→Success
iv. Result Failed because of the failure of the two operations, which were processed after writes from the other write operations.

The following tables show the state after the successful writes in the list above. Thus, after Write2 succeeds on Node #1:

| Node #1 | | Node #2 | | Node #3 | |
|---|---|---|---|---|---|
| Current | Previous | Current | Previous | Current | Previous |
| RV = 2 | RV = 1 | RV = 1 | Null | RV = 1 | Null |
| Write2 | Write1 | Write1 | | Write1 | |
| "b" | "a" | "a" | | "a" | |
| etagD | | etagB | | etagC | |

After Write3 succeeds on Node #2:

| Node #1 | | Node #2 | | Node #3 | |
|---|---|---|---|---|---|
| Current | Previous | Current | Previous | Current | Previous |
| RV = 2 | RV = 1 | RV = 2 | RV = 1 | RV = 1 | Null |
| Write2 | Write1 | Write3 | Write1 | Write1 | |
| "b" | "a" | "c" | "a" | "a" | |
| etagD | | etagE | | etagC | |

After Write4 succeeds on Node #3:

| Node #1 | | Node #2 | | Node #3 | |
|---|---|---|---|---|---|
| Current | Previous | Current | Previous | Current | Previous |
| RV = 2 | RV = 1 | RV = 2 | RV = 1 | RV = 2 | RV = 1 |
| Write2 | Write1 | Write3 | Write1 | Write4 | Write1 |
| "b" | "a" | "c" | "a" | "d" | "a" |
| etagD | | etagE | | etagF | |

As can be seen in the table above, because of the racing writes, no node has a current version that matches any other node. The only option is to initiate a repair operation (discussed in FIG. 6 below). In this instance, no quorum is possible and, as discussed in conjunction with FIG. 6 below, since consistency is broken the repair will "roll back" the state of the storage nodes to be that of the last successful write, which is the data in the previous storage state. Thus, repair will overwrite row version 2 with the value from row version 1:

1. OverwriteCurrent(Node #1, 2, Write1, "a", etagD)→Success
2. OverwriteCurrent(Node #2, 2, Write1, "a", etagE)→Success
3. OverwriteCurrent(Node #3, 2, Write1, "a", etagF)→Success Which will result in the following state for each of the storage nodes:

| Node #1 | | Node #2 | | Node #3 | |
|---|---|---|---|---|---|
| Current | Previous | Current | Previous | Current | Previous |
| RV = 2 | RV = 1 | RV = 2 | RV = 1 | RV = 2 | RV = 1 |
| Write1 | Write1 | Write1 | Write1 | Write1 | Write1 |
| "a" | "a" | "a" | "a" | "a" | "a" |
| etagG | | etagH | | etagI | |

Example 4

Repair after Failed Update. This example shows that a repair may be necessary after a failed update. In this example, the current state of the storage nodes is illustrated in the following table:

| Node #1 | | Node #2 | | Node #3 | |
|---|---|---|---|---|---|
| Current | Previous | Current | Previous | Current | Previous |
| RV = 2 | RV = 1 | RV = 1 | Null | RV = 1 | Null |
| Write2 | Write1 | Write1 | | Write1 | |
| "b" | "a" | "a" | | "a" | |
| etagD | | etagB | | etagC | |

As noted above, node 2 and 3 do not have row version 2. The last consistent value is version 1, value "a". In order to effectuate repair in this situation, the system first brings nodes 2 and 3 to the latest version number by rewriting the existing current node value as follows:

1. Update(Node #2, 2, Write1, "a", etagB)→Success
2. Update(Node #3, 2, Write1, "a", etagC)→Success This results in:

| Node #1 | | Node #2 | | Node #3 | |
|---|---|---|---|---|---|
| Current | Previous | Current | Previous | Current | Previous |
| RV = 2 | RV = 1 | RV = 2 | RV = 1 | RV = 2 | RV = 1 |
| Write2 | Write1 | Write1 | Write1 | Write1 | Write1 |
| "b" | "a" | "a" | "a" | "a" | "a" |
| etagD | | etagE | | etagF | |

The next step is to bring node 1 into alignment with the quorum by overwriting the current value for row version 2 with the last consistent value:

1. OvewriteCurrent(Node #1, 2, Write1, "a", etagD)→Success

This results in:

| Node #1 | | Node #2 | | Node #3 | |
|---|---|---|---|---|---|
| Current | Previous | Current | Previous | Current | Previous |
| RV = 2 | RV = 1 | RV = 2 | RV = 1 | RV = 2 | RV = 1 |
| Write1 | Write1 | Write1 | Write1 | Write1 | Write1 |
| "a" | "a" | "a" | "a" | "a" | "a" |
| etagG | | etagE | | etagF | |

Example 5

Repair during Update. This example shows that a repair may be necessary during an update. In this example, the current state of the storage nodes is illustrated in the following table:

| Node #1 | | Node #2 | | Node #3 | |
|---|---|---|---|---|---|
| Current | Previous | Current | Previous | Current | Previous |
| RV = 1 | Null | RV = 1 | Null | RV = 1 | Null |
| Write1 | | Write1 | | Write1 | |
| "a" | | "a" | | "a" | |
| etagA | | etagB | | etagC | |

The update operation writes value "b" (Write2→Update ("b", etags)) which breaks down into:
1. Update(Node #1, 2, Write2, "b", etagA)→Success
2. Update(Node #2, 2, Write2, "b", etagB)→Still in progress
3. Update(Node #3, 2, Write2, "b", etagC)→Still in progress Assuming that the updates to nodes 2 and 3 are still in progress or if something interrupts the updates to nodes 2 and 3.

| Node #1 | | Node #2 | | Node #3 | |
|---|---|---|---|---|---|
| Current | Previous | Current | Previous | Current | Previous |
| RV = 2 | RV = 1 | RV = 1 | Null | RV = 1 | Null |
| Write2 | Write1 | Write1 | | Write1 | |
| "b" | "a" | "a" | | "a" | |
| etagD | | etagB | | etagC | |

If the repair process now comes along and identifies a repair is needed, the updates above to nodes 2 and 3 may not be able to complete. The repair process will identify that nodes 2 and 3 do not have row version 2. The repair process will initiate the overwrite of the current information at nodes 2 and 3 to bring them up to the most current row version as identified above:
1. Update(Node #2, 2, Write1, "a", etagB)→Success
2. Update(Node #3, 2, Write1, "a", etagC)→Still in progress Which results in the following (assuming the update to node 3 is still in progress):

| Node #1 | | Node #2 | | Node #3 | |
|---|---|---|---|---|---|
| Current | Previous | Current | Previous | Current | Previous |
| RV = 2 | RV = 1 | RV = 2 | RV = 1 | RV = 1 | Null |
| Write2 | Write1 | Write1 | Write1 | Write1 | |
| "b" | "a" | "a" | "a" | "a" | |
| etagD | | etagE | | etagC | |

At this point there are at least two outstanding Update (Node #3) calls, the one from the original update (write2) and the one from the repair overwrite (write1). This can result in one of three situations:
1. If Write2 wins, then "b" is the correct value and it will be reinforced on Node #2. Write2 is successful.
2. If repair (Write1 propagated onto row version 2) wins, then "a" is the correct value and it will be reinforced on Node #1. Write2 is failed.
3. If a third writer exists and wins, then there is no correct value for row version 2 (see Example 3: Racing Updates with Repair). Repair will be required and, since all nodes have row version 2, the value from row version 1 will be selected and overwritten onto the rows. Both Write2 and this third writer are failed.

Example Machine Architecture and Machine-Readable Medium

Figure 8:
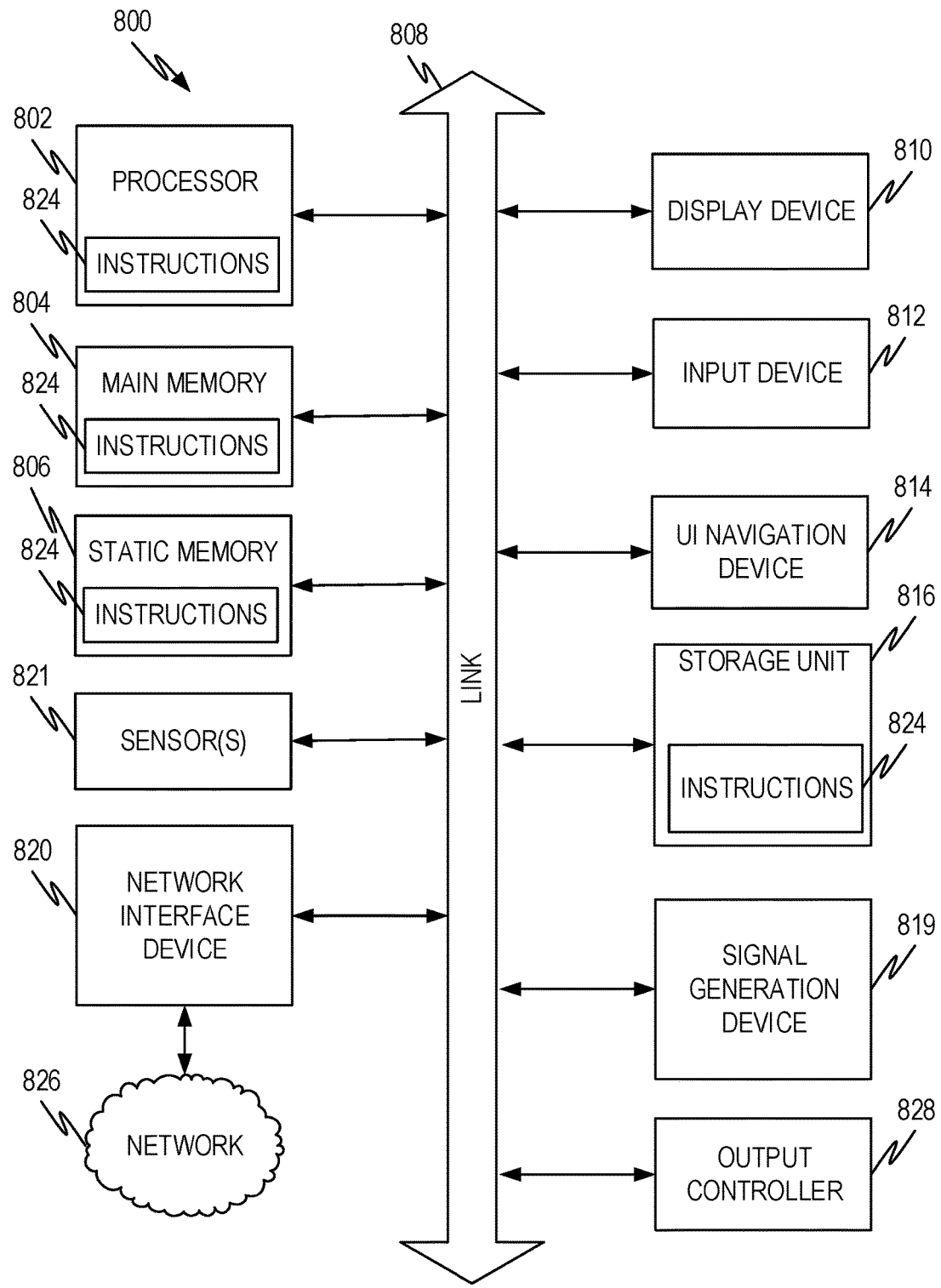
FIG. 8 illustrates a representative machine architecture suitable for implementing the systems and so forth or for executing the methods disclosed herein.

FIG. 8 illustrates a representative machine architecture suitable for implementing the systems and so forth or for executing the methods disclosed herein.

The machine of FIG. 8 is shown as a standalone device, which is suitable for implementation of the concepts above. For the server aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 8 is suitable to allow those of skill in the art to determine how to implement the embodiments previously described with an appropriate combination of hardware and software, with appropriate modification to the illustrated embodiment to the particular device, machine, etc. used.

While only a single machine is illustrated, the term "machine" shall also be taken to include any collection of machines that individually or jointly execute a set (or multiple sets) of instructions to perform any one or more of the methodologies discussed herein.

The example of the machine 800 includes at least one processor 802 (e.g., a central processing unit (CPU), a graphics processing unit (GPU), advanced processing unit (APU), or combinations thereof), one or more memories such as a main memory 804, a static memory 806, or other types of memory, which communicate with each other via link 808. Link 808 may be a bus or other type of connection channel. The machine 800 may include further optional aspects such as a graphics display unit 810 comprising any type of display. The machine 800 may also include other optional aspects such as an alphanumeric input device 812 (e.g., a keyboard, touch screen, and so forth), a user interface (UI) navigation device 814 (e.g., a mouse, trackball, touch device, and so forth), a storage unit 816 (e.g., disk drive or other storage device(s)), a signal generation device 818 (e.g., a speaker), sensor(s) 821 (e.g., global positioning sensor, accelerometer(s), microphone(s), camera(s), and so forth), output controller 828 (e.g., wired or wireless connection to connect and/or communicate with one or more other devices such as a universal serial bus (USB), near field communication (NFC), infrared (IR), serial/parallel bus, etc.), and a network interface device 820 (e.g., wired and/or wireless).

Executable Instructions and Machine-Readable Medium

The various memories (i.e., 804, 806, and/or memory of the processor(s) 802) and/or storage unit 816 may store one or more sets of instructions and data structures (e.g., software) 824 embodying or utilized by any one or more of the methodologies or functions described herein. These instructions, when executed by processor(s) 802 cause various operations to implement the disclosed embodiments.

As used herein, the terms "machine-readable medium" and "computer-readable medium" mean the same thing and may be used interchangeably in this disclosure. The terms include a single medium or multiple media (e.g., a centralized or distributed database, and/or associated caches and servers) that store the one or more instructions or data structures. The terms shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The terms shall accordingly be taken to include, but not be limited to, solid-state memories, and optical and magnetic media. Specific examples of machine-readable media/computer-readable media include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks. The terms specifically exclude non-statutory signals per se, which are covered under the term "signal medium" discussed below.

Signal Medium

The term "signal medium" shall be taken to include any form of modulated data signal and signals per se. The term "modulated data signal" means a signal that has one or more of its characteristics set or changed in such a matter as to encode information in the signal.

EXAMPLE EMBODIMENTS

Example 1

A method comprising:
receiving, from a client application, a key associated with data to be read;
sending the key to each of a plurality of data storage nodes;
responsive to the sending, receiving a number of responses from the plurality of data storage nodes;
determining whether the received number of responses represents a quorum of the plurality of data storage nodes having a matching version of stored data;
responsive to determining the received number of responses represents the quorum, returning the matching version of the stored data to the client application.

Example 2

The method of examples 1, further comprising:
responsive to determining the received number of responses does not represent a quorum, returning either failure or unknown result to the client application.

Example 3

The method of examples 1 or 2, wherein determining whether the received number of responses represents the quorum comprises:
for each of the received number of responses:
identifying a version number and a value for stored data;
identifying a match between two received responses if the version number in the two received responses match;
counting a number of matches in the received responses; and
determining that a quorum exists when the number of matches equals or exceeds a majority of the plurality of storage nodes.

Example 4

The method of examples 1 or 2, wherein sending the key to each of the plurality of data storage nodes comprises creating a read message comprising a storage node unique key derived from the key and sending the read message to the plurality of data storage nodes.

Example 5

The method of examples 1 or 2, further comprising:
responsive to determining the received number of responses does not represent a quorum, returning an indication of unknown result when no response is received from a majority of the plurality of data storage nodes.

Example 6

The method of examples 1 or 2, further comprising waiting a designated time period for responses and wherein the received number of responses is the number of those responses received during the designated time period.

Example 7

The method of examples 1 or 2, further comprising:
determining whether repair is needed; and
responsive to determining that repair is needed:
overwriting data in each storage node not storing a last consistent value of the data.

Example 8

The method of examples 1 or 2, further comprising:
determining whether repair is needed; and
responsive to determining that repair is needed:
overwriting data stored in each node not storing a value of the data stored by a majority of the plurality of storage nodes.

Example 9

The method of examples 1 or 2, wherein each response received from a storage node comprises a version number and a value.

Example 10

A method comprising:
 receiving, from a client application, data to be stored;
 sending a key to each of a plurality of data storage nodes along with the data to be stored;
 responsive to the sending, receiving a number of responses from the plurality of data storage nodes;
 determining whether the received number of responses represents a quorum of the plurality of data storage nodes having successfully stored the data;
 responsive to determining the received number of responses represents the quorum, returning an indication of success to the client application.

Example 11

The method of example 10, further comprising:
 receiving the key from the client application.

Example 12

The method of example 10, wherein determining whether the received number of responses represents the quorum comprises:
 for each of the received number of responses:
 identifying a version number for the stored data;
 identifying a match between two received responses if the version number in the two received responses match;
 counting a number of matches in the received responses; and
 determining that a quorum exists when the number of matches equals or exceeds a majority of the plurality of storage nodes.

Example 13

The method of example 10 wherein sending the key to each of the plurality of data storage nodes comprises creating a write message comprising the key and the data to be stored and sending the write message to the plurality of data storage nodes.

Example 14

The method of examples 10, 11, 12, or 13, further comprising:
 responsive to determining the received number of responses does not represent a quorum, returning to the client application an indication of result unknown when no response is received from a majority of the plurality of data storage nodes.

Example 15

The method of examples 10, 11, 12, or 13, further comprising:
 responsive to determining the received number of responses does not represent a quorum, returning to the client application an indication of failure when responses received from a majority of the plurality of data storage nodes do not indicate a successful write of the data.

Example 16

The method of examples 10, 11, 12, or 13, further comprising waiting a designated time period for responses and wherein the received number of responses is the number of those responses received during the designated time period.

Example 17

The method of examples 10, 11, 12, or 13, further comprising:
 identifying a version number for each of the plurality of storage nodes;
 modifying the version number; and
 sending the modified version number to the plurality of storage nodes.

Example 18

The method of examples 10, 11, 12, or 13, wherein each response received from a storage node comprises a version number and a value.

Example 19

A computing system comprising:
 a processor and executable instructions accessible on a machine-readable medium that, when executed, cause the system to perform operations comprising:
 perform a write data operation comprising:
 receiving, from a client application, data to be stored;
 sending a key to each of a plurality of data storage nodes along with the data to be stored;
 responsive to the sending, receiving a number of responses from the plurality of data storage nodes;
 determining whether the received number of responses represents a quorum of the plurality of data storage nodes having successfully stored the data;
 responsive to determining the received number of responses represents the quorum, returning an indication of success to the client application;
 perform a read data operation comprising:
 receiving, from the client application, the key associated with data to be read;
 sending the key to each of the plurality of data storage nodes;
 responsive to the sending, receiving a second number of responses from the plurality of data storage nodes;
 determining whether the received second number of responses represents a quorum of the plurality of data storage nodes having a matching version of stored data;
 responsive to determining the received number of responses represents the quorum, returning the matching version of the stored data to the client application.

Example 20

The system of example 19, further comprising determining whether repair is needed and, responsive to determining that repair is needed performing at least one of:
 overwriting data in each storage node not storing a last consistent version of the data; or overwriting data stored in each node not storing a version of the data stored by a majority of the plurality of storage nodes.

Example 21

A method comprising:
receiving, from a client application, a key associated with data to be read;
sending the key to each of a plurality of data storage nodes;
responsive to the sending, receiving a number of responses from the plurality of data storage nodes;
determining whether the received number of responses represents a quorum of the plurality of data storage nodes having a matching version of stored data;
responsive to determining the received number of responses represents the quorum, returning the matching version of the stored data to the client application.

Example 22

The method of example 21, further comprising:
responsive to determining the received number of responses does not represent a quorum, returning either failure or unknown result to the client application.

Example 23

The method of examples 21 or 22, wherein determining whether the received number of responses represents the quorum comprises:
for each of the received number of responses:
identifying a version number and a value for stored data;
identifying a match between two received responses if the version number in the two received responses match;
counting a number of matches in the received responses; and
determining that a quorum exists when the number of matches equals or exceeds a majority of the plurality of storage nodes.

Example 24

The method of examples 21, 22 or 23, wherein sending the key to each of the plurality of data storage nodes comprises creating a read message comprising a storage node unique key derived from the key and sending the read message to the plurality of data storage nodes.

Example 25

The method of examples 21, 22, 23 or 24, further comprising:
responsive to determining the received number of responses does not represent a quorum, returning an indication of unknown result when no response is received from a majority of the plurality of data storage nodes.

Example 26

The method of examples 21, 22, 23, 24 or 25, further comprising waiting a designated time period for responses and wherein the received number of responses is the number of those responses received during the designated time period.

Example 27

The method of examples 21, 22, 23, 24, 25 or 26, further comprising:
determining whether repair is needed; and
responsive to determining that repair is needed:
overwriting data in each storage node not storing a last consistent value of the data.

Example 28

The method of examples 21, 22, 23, 24, 25, 26 or 27, further comprising:
determining whether repair is needed; and
responsive to determining that repair is needed:
overwriting data stored in each node not storing a value of the data stored by a majority of the plurality of storage nodes.

Example 29

The method of examples 21, 22, 23, 24, 25, 26, 27 or 28, wherein each response received from a storage node comprises a version number and a value.

Example 30

A method of examples 21, 22, 23, 24, 25, 26, 27, 28 or 29 further comprising:
receiving, from a client application, data to be stored;
sending a second key to each of a plurality of data storage nodes along with the data to be stored;
responsive to the sending, receiving a number of responses from the plurality of data storage nodes;
determining whether the received number of responses represents a quorum of the plurality of data storage nodes having successfully stored the data;
responsive to determining the received number of responses represents the quorum, returning an indication of success to the client application.

Example 31

The method of example 30, further comprising:
receiving the second key from the client application.

Example 32

The method of examples 30 or 31 wherein sending the key to each of the plurality of data storage nodes comprises creating a write message comprising a key for each data storage node derived from the second key and the data to be stored and sending the write message to the plurality of data storage nodes.

Example 33

The method of examples 30, 31, or 32, further comprising:
responsive to determining the received number of responses does not represent a quorum, returning to the client application an indication of failure when responses received from a majority of the plurality of data storage nodes do not indicate a successful write of the data.

Example 34

An apparatus comprising means to perform a method as claimed in any preceding claim.

Example 35

Machine-readable storage including machine-readable instructions, when executed, to implement a method or realize an apparatus as claimed in any preceding claim.

CONCLUSION

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

What is claimed is:

1. A method performed by a storage manager connected to a plurality of data storage nodes, the method comprising:
    receiving, from a client application, a key associated with data to be read;
    sending the key to each of a plurality of data storage nodes;
    responsive to the sending, receiving a number of responses from the plurality of data storage nodes;
    determining whether the received number of responses represents a quorum of the plurality of data storage nodes having a matching version of stored data;
    responsive to determining the received number of responses represents the quorum, returning the matching version of the stored data to the client application.

2. The method of claim 1, further comprising:
    responsive to determining the received number of responses does not represent a quorum, returning either failure or unknown result to the client application.

3. The method of claim 1, wherein determining whether the received number of responses represents the quorum comprises:
    for each of the received number of responses:
        identifying a version number and a value for stored data;
        identifying a match between two received responses if the version number in the two received responses match;
    counting a number of matches in the received responses; and
    determining that a quorum exists when the number of matches equals or exceeds a majority of the plurality of storage nodes.

4. The method of claim 1 wherein sending the key to each of the plurality of data storage nodes comprises creating a read message comprising a storage node unique key derived from the key and sending the read message to the plurality of data storage nodes.

5. The method of claim 1, further comprising:
    responsive to determining the received number of responses does not represent a quorum, returning an indication of unknown result when no response is received from a majority of the plurality of data storage nodes.

6. The method of claim 1, further comprising waiting a designated time period for responses and wherein the received number of responses is the number of those responses received during the designated time period.

7. The method of claim 1, further comprising:
    determining whether repair is needed; and
    responsive to determining that repair is needed:
        overwriting data in each storage node not storing a last consistent value of the data.

8. The method of claim 1, further comprising:
    determining whether repair is needed; and
    responsive to determining that repair is needed:
        overwriting data stored in each node not storing a value of the data stored by a majority of the plurality of storage nodes.

9. The method of claim 1, wherein each response received from a storage node comprises a version number and a value.

10. A method comprising:
    receiving, from a client application, data to be stored;
    sending a storage request comprising a key and the data to be stored to each of a plurality of data storage nodes;
    responsive to the sending, waiting for occurrence of a first occurring return event from among a set of plurality of return events, the set of plurality of return events comprising:
        expiration of a wait period;
        identification of a quorum of the plurality of data storage nodes indicating successful storage of the data; and
        identification that the quorum of the plurality of data storage nodes indicating successful storage of the data cannot be achieved;
    responsive the first occurring return event comprising identification of a quorum of the plurality of data storage nodes indicating successful storage of the data, returning an indication of success to the client application.

11. The method of claim 10, further comprising:
    receiving the key from the client application.

12. The method of claim 10, wherein identification of a quorum of the plurality of storage nodes indicating successful storage of the data comprises:
    receiving a response from a plurality of data storage nodes;
    for each received response:
        identifying a version number for the stored data;
        identifying a match between two received responses if the version number in the two received responses match;
    counting a number of matches in the received responses; and
    determining that a quorum exists when the number of matches equals or exceeds a majority of the plurality of storage nodes.

13. The method of claim 10, further comprising:
    responsive to the first occurring return event comprising expiration of a wait period or identification that the quorum of the plurality of data storage nodes indicating successful storage of the data cannot be achieved, returning to the client application an indication of result unknown when no response is received from a majority of the plurality of data storage nodes.

14. The method of claim 10, further comprising:
responsive to the first occurring return event comprising expiration of a wait period or identification that the quorum of the plurality of data storage nodes indicating successful storage of the data cannot be achieved, returning to the client application an indication of failure when responses received from a majority of the plurality of data storage nodes do not indicate a successful write of the data.

15. The method of claim 10, further comprising:
identifying a version number for each of the plurality of storage nodes;
modifying the version number; and
sending the modified version number to the plurality of storage nodes.

16. The method of claim 10, wherein each response received from a storage node comprises a version number and a value.

17. A computing system comprising:
a processor and executable instructions accessible on a machine-readable medium that, when executed, cause the system to perform operations comprising:
perform a write data operation comprising:
receiving, from a client application, data to be stored;
sending a key to each of a plurality of data storage nodes along with the data to be stored;
responsive to the sending, receiving a number of responses from the plurality of data storage nodes;
determining whether the received number of responses represents a quorum of the plurality of data storage nodes having successfully stored the data;
responsive to determining the received number of responses represents the quorum, returning an indication of success to the client application;
perform a read data operation comprising:
receiving, from the client application, the key associated with data to be read;
sending the key to each of the plurality of data storage nodes;
responsive to the sending, receiving a second number of responses from the plurality of data storage nodes;
determining whether the received second number of responses represents a quorum of the plurality of data storage nodes having a matching version of stored data;
responsive to determining the received number of responses represents the quorum, returning the matching version of the stored data to the client application.

18. The system of claim 17, further comprising determining whether repair is needed and, responsive to determining that repair is needed performing at least one of:
overwriting data in each storage node not storing a last consistent version of the data; or
overwriting data stored in each node not storing a version of the data stored by a majority of the plurality of storage nodes.

* * * * *